(12) United States Patent
King et al.

(10) Patent No.: US 8,800,471 B2
(45) Date of Patent: Aug. 12, 2014

(54) ADHESIVE TAPE WITH VISUAL INDICATORS AND ASSOCIATED METHODS OF USE

(75) Inventors: Martin King, Vashon Island, WA (US); Cheryl Grunbock, legal representative, Vashon Island, WA (US); Sharon Quinn, Bellevue, WA (US)

(73) Assignee: Sharon Quinn, Bellevue, WA (US)

( * ) Notice: Subject to any disclaimer, the term of this patent is extended or adjusted under 35 U.S.C. 154(b) by 617 days.

(21) Appl. No.: 13/051,809

(22) Filed: Mar. 18, 2011
(Under 37 CFR 1.47)

(65) Prior Publication Data

US 2011/0232560 A1 Sep. 29, 2011

Related U.S. Application Data

(60) Provisional application No. 61/316,638, filed on Mar. 23, 2010.

(51) Int. Cl.
*C09J 7/02* (2006.01)
*B23B 7/12* (2006.01)

(52) U.S. Cl.
USPC ............ 116/200; 116/201; 428/343; 428/354

(58) Field of Classification Search
CPC ................ C09J 7/02; B32B 7/02; B32B 7/04; B32B 7/12
USPC .............. 116/200, 201; 33/758; 428/343, 354
See application file for complete search history.

(56) References Cited

U.S. PATENT DOCUMENTS

| | | | | |
|---|---|---|---|---|
| 2,077,242 A | * | 4/1937 | La Pierre | 283/115 |
| 2,622,656 A | * | 12/1952 | Pinsky | 428/41.7 |
| 3,537,578 A | * | 11/1970 | Figliuzzi | 242/160.1 |
| 3,935,960 A | * | 2/1976 | Cornell | 220/260 |

(Continued)

FOREIGN PATENT DOCUMENTS

| | | | | | |
|---|---|---|---|---|---|
| JP | 2005171084 A | * | 6/2005 | | C09J 7/02 |
| JP | 2009046538 A | * | 3/2009 | | C09J 7/02 |
| TW | 200938400 A | * | 9/2009 | | B43M 11/00 |

OTHER PUBLICATIONS

Golijan, Rosa., "The Struggle to Find Where the Sticky Tape Begins Could be Over." <http://gizmodo.com/5629744/the-struggle-to-find-where-the-sticky-tap...> Sep. 3, 2010.

(Continued)

*Primary Examiner* — R A. Smith
(74) *Attorney, Agent, or Firm* — Lee & Hayes, PLLC

(57) ABSTRACT

A visual indicator used to indicate a disposition of an end of a tape comprises a colored layer, and one or more layers of elongate polymer elements, or one or more polarizing layers, or one or more dichroic filter layers. When the tape is stretched as a piece is torn or cut away, an orientation of the polymer elements, or a polarization configuration, or a thickness of the dichroic layers is changed, changing a color, opacity, or reflectance visually evident at the end of the tape. In other embodiments, the visual indicator comprises one or more visible lines that run diagonally across the width of the tape, either in successive sections or along the entire length, so that a discontinuity between the line at the end and at an adjacent point on the remainder of the tape indicates the disposition of the end and an approximate amount of tape remaining.

17 Claims, 1 Drawing Sheet

(56) References Cited

U.S. PATENT DOCUMENTS

| | | | | |
|---|---|---|---|---|
| 4,149,320 A | * | 4/1979 | Troyer et al. | 33/758 |
| 4,195,787 A | * | 4/1980 | Thomason | 40/360 |
| 4,489,841 A | * | 12/1984 | Thompson | 215/203 |
| 4,557,505 A | * | 12/1985 | Schaefer et al. | 283/81 |
| 4,851,064 A | * | 7/1989 | Darbo | 156/153 |
| 4,898,762 A | * | 2/1990 | Brown et al. | 428/152 |
| 4,994,314 A | * | 2/1991 | Rosenfeld et al. | 428/36.92 |
| 6,282,807 B1 | * | 9/2001 | Johnson | 33/733 |
| 6,416,857 B1 | * | 7/2002 | Wright et al. | 428/343 |
| 6,767,628 B1 | * | 7/2004 | Posa et al. | 428/343 |
| 6,898,881 B2 | * | 5/2005 | Morrison | 40/299.01 |
| 7,135,212 B2 | * | 11/2006 | Monschein et al. | 428/41.8 |
| 7,517,585 B1 | | 4/2009 | Funderburk et al. | 428/354 |
| 8,557,378 B2 | * | 10/2013 | Yamanaka et al. | 428/343 |
| 2004/0234732 A1 | * | 11/2004 | Posa et al. | 428/192 |
| 2007/0259174 A1 | * | 11/2007 | Albanese et al. | 428/345 |
| 2009/0022986 A1 | * | 1/2009 | Wesselmann et al. | 428/345 |
| 2010/0285398 A1 | * | 11/2010 | Hogerton et al. | 430/2 |
| 2012/0196121 A1 | * | 8/2012 | Schwietz | 428/354 |
| 2013/0122292 A1 | * | 5/2013 | Carrdine | 428/354 |
| 2014/0041572 A1 | * | 2/2014 | Schuler et al. | 116/201 |

OTHER PUBLICATIONS

"Use Paper Clip to Mark Tape End." <www.thriftyfun.com/tf76640784.tip.html>, printed Oct. 13, 2010.

* cited by examiner

EITHER ONE OF A PLURALITY OF SECTIONS OR ENTIRE TAPE ular embodiment of the disclosure includes a visual indication extending diagonally along the tape such that the position of the visual indication at the point of separation on the tape provides an indication of the location of the end of the tape and which can also indicate a percentage of tape remaining on a roll.

More specifically, a tape is provided with a visual indication to show where an end of the tape is located. The tape includes a backing material provided with an adhesive that enables the tape to adhere to a surface on which the tape is applied. A visual indicator is included and has a physical configuration that changes as a desired length of the tape is cut or torn from a remainder of the tape, so that the change in the physical configuration of the visual indicator enables a user to visually determine where the end of the tape is adhered to the remainder of the tape.

The tape further includes a central core on which the tape is rolled.

The change in the configuration of the visual indicator is caused by stretching the tape where it is cut or torn away from the remainder of the tape, and the stretching of the tape at that point causes the visual indicator to change at least one physical characteristic. These physical characteristics include a color that is visually apparent at the end of the tape, an opacity that is visually apparent at the end of the tape, a reflectance that is visually apparent at the end of the tape, and a displacement between the visual indicator at the end of the tape and the visual indicator at a position on the remainder of the tape that is adjacent to the end of the tape.

In one exemplary embodiment, the visual indicator comprises at least one layer of elongate polymer elements that are either initially randomly oriented before the tape is stretched, or after the tape is stretched. Stretching of the tape occurs at the point where the tape is cut or torn when removing the desired length from the remainder of the tape. The random orientation of the elongate polymer elements produces a different visually perceptible physical characteristic than the aligned orientation of the elongate polymer elements. The elongate polymer elements comprise polymer strings.

In another exemplary embodiment, the visual indicator comprises at least one layer of elongate polymer elements. The elongate polymer elements experience a change in cross-sectional size as the tape is stretched while cutting or tearing the desired length from the remainder of the tape. The change in the cross-sectional size of the elongated polymer elements causes a perceptible change in a visual characteristic of the elongate polymer elements, causing the end of the tape to be visually evident.

In yet another exemplary embodiment, the visual indicator comprises a polarizing layer of amorphous or randomly oriented polymers, overlying a colored layer. The colored layer becomes visible through the polarizing layer due to the polymers becoming aligned as the tape is stretched when cutting or tearing the desired length from the remainder of the tape. Further, the visibility of the colored layer at the end of the tape is readily perceptible through the aligned polymers in the polarizing layer.

For still another exemplary embodiment, the visual indicator comprises two polarizing layers overlying a colored layer. An alignment between the two polarizing layers changes as the tape is stretched when cutting or tearing the desired length from the remainder of the tape. As a result, a visibility of the colored layer through the two polarizing layers changes, enabling the end of the tape to be visually perceptible.

Also, the visual indicator of some exemplary embodiments can include one or more dichroic filter layers that each selec-

ADHESIVE TAPE WITH VISUAL INDICATORS AND ASSOCIATED METHODS OF USE

RELATED APPLICATIONS

This application is based on a prior copending provisional application Ser. No. 61/316,638, filed on Mar. 23, 2010, the benefit of the filing date of which is hereby claimed under 35 U.S.C. §119(e).

BACKGROUND

Technology continues to develop new types of tape for specific applications. Adhesive backed clear or translucent tape has been used for years in wrapping packages and for other purposes. No handyman would be able to get along without a roll of "duct tape," which is used for many other utilitarian purposes besides sealing the seams where metal ducts are joined together. The properties of the adhesive backing on a specific tape often relate to the intended functionality or application of the tape, but in many cases, tape originally manufactured for one purpose is equally useful in many other applications. As a result of the wide-spread use of tape that is sold in rolls, a typical household will include several different types.

A tape dispenser can be very useful in facilitating the use of a roll of tape, since the dispenser may provide a sharp or serrated edge for tearing the tape from a roll after a desired length has been unrolled. The surface of this edge also helps by retaining the tag end of the tape until another length is dispensed from the roll. However, the adhesive on the tag end may not retain the end on the surface provided where the last piece of tape was torn or cut away. Also, rolls of tape are often sold or used without a dispenser. In either case, it is common for the tag end of the tape to adherently attach itself to the tape still on the roll, so that the tag end is not provided to the user so that it can be readily grasped when dispensing another desired length of tape.

While some types of tape are sufficiently thick so that the tag end of the tape is readily apparent by touch, the tag end that is adhered to the roll of tape for thinner tapes can be more difficult to locate. If provided the opportunity, a user can simply turn under a corner of the tape before it attaches itself to the roll. However, that option is not always available, if the user releases the tag end before the corner can be turned under. It can be extremely frustrating to search for the end of the tape so that more tape can be dispensed from a roll under these conditions, since the end of many types of tapes is almost invisible once the tape has self-adhered to the underlying roll of tape. Accordingly, it would be desirable to provide a way to more readily visually perceive where the tag end of the tape is disposed at such times.

SUMMARY

In consideration of the foregoing issues, exemplary embodiments of a novel approach are directed to an adhesive tape that includes visual indication features useful for indicating where the end of the tape is disposed when the end is adhered to the underlying tape on a roll. Also disclosed herein are associated methods of use and manufacture for such an adhesive tape. An adhesive tape configured in accordance with one exemplary embodiment of the following disclosure includes an adhesive tape that when torn, cut, or otherwise separated changes color at the point of separation. Moreover, an adhesive tape configured in accordance with another tively pass light of a different waveband or wavelength corresponding to a specific range of colors. The one or more dichroic filter layers overlay a colored layer, so that as the tape is stretched when cutting or tearing the desired length from the remainder of the tape, the one or more dichroic layers become thinner. A change in the thickness of the one or more dichroic layers changes the waveband or wavelength of light passed through the one or more dichroic filter layers. Thus, a color of the light passed through each dichroic filter is altered, thereby changing a visual characteristic of the colored layer visible through the one or more dichroic filters at the end of the tape.

In a somewhat different exemplary embodiment, the visual indicator comprises a visible line that extends diagonally across the width of the tape between opposite ends of at least a section of the tape. A disposition of the visible line between opposite edges of the tape at the end of the tape, where the desired length of the tape was cut or torn away, is different than a disposition of the visible line on the remainder of the tape at a point immediately adjacent to the end of the tape. A resulting discontinuity in a path of the visible line across the end of the tape at this point is visibly perceptible.

In addition, the visual indicator can indicate an approximate amount of the tape remaining after the desired length was cut or torn away, since the disposition of the visible line between the opposite edges of the tape at the end of the tape corresponds approximately to a percentage of the tape remaining. In some exemplary embodiments, the visual indicator comprises a plurality of visible lines, each with different visible characteristics and each being applied diagonally between opposite corners of a corresponding different section of the tape. A specific visible characteristic of the visual indicator that is evident at the end of the tape then indicates a percentage range of the tape remaining. In addition, the disposition of the visible line between the opposite edges of the tape, at the end of the tape indicates an approximate portion of the percentage range remaining.

The visual indicator can comprise at least one of a segmented line, a discontinuous line, and a curved line and can include symbols or marks indicating a percentage of the tape remaining unused.

Another aspect of this technology is directed to a method for enabling a user to more readily visually determine where an end of a tape is disposed, when an adhesive on the tape adheres the end to a remainder of the tape. This method includes steps that are substantially consistent with the functionality of the tape discussed above.

It will be understood that the disclosures and drawings of the patent application identified above as a related application are specifically incorporated herein by reference.

This Summary has been provided to introduce a few concepts in a simplified form that are further described in detail below in the Description. However, this Summary is not intended to identify key or essential features of the claimed subject matter, nor is it intended to be used as an aid in determining the scope of the claimed subject matter.

DRAWINGS

Various aspects and attendant advantages of one or more exemplary embodiments and modifications thereto will become more readily appreciated as the same becomes better understood by reference to the following detailed description, when taken in conjunction with the accompanying drawings, wherein.

DESCRIPTION

Figure 1A:
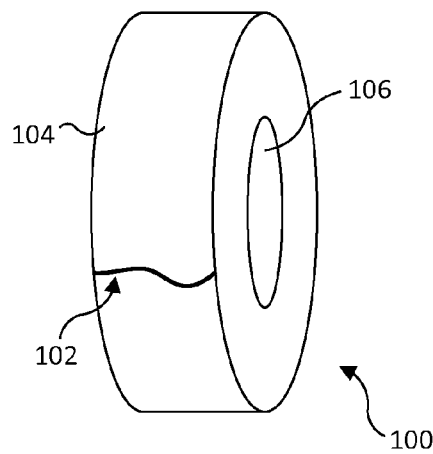
FIG. 1A is an isometric view of a roll of tape configured in accordance with one embodiment of the disclosure.

Figures and Disclosed Embodiments are not Limiting

Exemplary embodiments are illustrated in referenced Figures of the drawings. It is intended that the embodiments and Figures disclosed herein are to be considered illustrative rather than restrictive. No limitation on the scope of the technology and of the claims that follow is to be imputed to the examples shown in the drawings and discussed herein. Further, it should be understood that any feature of one embodiment disclosed herein can be combined with one or more features of any other embodiment that is disclosed, unless otherwise indicated.

Tape including visual indicators and associated methods for using and making such tape are described in detail herein in accordance with exemplary embodiments of the present disclosure. Certain details are set forth in the following description and Figures to provide a thorough and enabling description of various embodiments of the disclosure. Other details describing well-known structures and components often associated with tape and methods of forming such products, however, are not set forth below to avoid unnecessarily obscuring the description of the exemplary embodiments.

Many of the details, dimensions, angles, relative sizes of components, and/or other features shown in the Figures are merely illustrative of particular embodiments of the disclosure. Accordingly, other embodiments can have other details, dimensions, angles, sizes, and/or features without departing from the spirit and scope of the present disclosure. Moreover, certain features described with reference to specific embodiments may be combined with other embodiments of the disclosure. In addition, further embodiments of the disclosure may be practiced without several of the details described below, while still other embodiments of the disclosure may be practiced with additional details and/or features.

FIG. 1A is an isometric view of a tape 100 that is rolled and configured in accordance with an exemplary embodiment of the present approach. In the illustrated embodiment, tape 100 can be any suitable type of adhesive or pressure-sensitive tape, including, for example, and without any intended limitation, self-stick tape, double-sided tape, masking tape, electrical tape, duct tape, medical or surgical tape, cellophane tape, etc. In the illustrated embodiment, tape 100 is configured to provide one or more markings or indicia of an end portion 102 (i.e., a tag end) of tape 100. More specifically, tape 100 includes a substrate or backing material 104 and is wound around a central support member or core 106. Tape 100 also includes an adhesive (not separately shown or identified, since such provision of an adhesive layer on tape is well known to those of ordinary skill in this art) that is carried by backing material 104. The adhesive and backing material 104 are configured to enable a user to unwind a piece of tape 100 in a desired length, and then tear, cut, or otherwise separate the piece of tape 100 from the roll, so that the piece of tape can be adhesively attached to any desired surface or object. Although tape 100 of the illustrated embodiment is shown in a wound or rolled configuration, in other embodiments, tape 100 can be stored or packaged in other configurations.

Figure 1B:
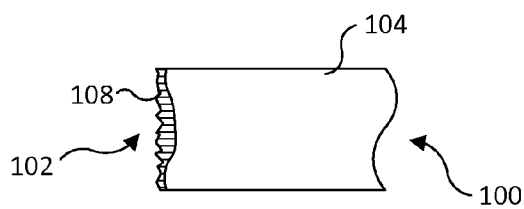
FIG. 1B is a plan view showing a portion of the tape remaining on the roll of tape and the end of tape, with the visual indicator visibly apparent where the tape was stretched when a piece was torn or cut away from the remainder on the roll.

According to one feature of the illustrated exemplary embodiment, the end portion 102 of the tape 100 is configured to provide a visual indication to enable a user to easily locate end portion 102. More specifically, when a user tears, cuts, or otherwise removes a piece of tape 100 from the roll, an edge 108 of end portion 102 remaining on the roll changes color or provides another type of visual indication, as indicated in FIG. 1B. For example, and as described in detail below, in response to tearing, cutting, or otherwise removing a piece of tape 100, the torn or cut edge of end portion 102 can change color, becoming either a lighter or a darker shade, and/or otherwise provide a distinguishing indication from the adjacent portions of backing material 104 on the roll. In this manner, a user can easily locate end portion 102, thereby avoiding the inconvenience often associated with trying to find the end of a roll of tape after the end has self-adhered itself to the underlying roll. Each of the different embodiments disclosed below thus comprise means for visually indicating a disposition of the end of the tape, enabling a user to readily locate the end where it may be adhered to the remaining tape.

In one exemplary embodiment, tape 100 can comprise one or more layers of colored polymers in an elongate form or polymer strings (e.g., plastic polymers) that provide the color change at the torn or cut edge of end portion 102 of tape 100. More specifically, the tape 100 can include one or more layers with the elongate form of the polymers oriented in an irregular or amorphous pattern. When a user stretches tape 100 during the process of cutting or tearing the tape to remove a piece of tape 100, the tension, and/or other severing force applied to the tape, will align or otherwise reorient the polymers to change the visible color or opacity of edge 108, at end portion 102 on tape 100. In addition to, or instead of aligning the polymers, the tension and/or other severing force applied to the tape 100 when tearing or cutting a piece of tape from the roll can also change the shape of the polymers, thereby effecting a visual indication of end portion 102 of tape 100. For example, the applied tension can change the cross-sectional size (e.g., reduce the diameter) of each of the polymer elements in the tape, thereby changing the visual characteristics of end portion 102 of tape 100. The alignment and/or deformation changing the cross-sectional size of the polymer elements can accordingly change the color of end portion 102 of tape 100, as well as change other visual characteristics of end portion 102, including, for example, the opacity and/or reflectance of edge 108 at end portion 102.

In other exemplary embodiments, tape 100 can be configured to include one or more polarizing layers to provide desired visual indication properties at end portion 102. For example, the backing material 104 can include a first colored substrate layer disposed beneath a polarizing layer. The polarizing layer can comprise amorphous or randomly oriented polymers. As tension is applied to tape 100 (e.g., such as when a user tears or cuts off a piece of the tape), this polarizing layer will be stretched, thereby aligning the polymers over the colored substrate. When the polymers of the polarizing layer are aligned, the colored substrate accordingly becomes visible through the polarizing layer.

In yet another embodiment, backing material 104 can include three or more layers with at least one polarizing layer. For example, backing material 104 can include a colored substrate layer and a first polarized layer disposed over the colored substrate. The polarized layer can include polymers that are generally aligned or oriented in a first direction. Backing material 104 can also include a second polarizing layer comprising polymers oriented in a random or amorphous arrangement. When tension (and/or other severing force) is applied to backing material 104, the polymers of the second polarizing layer can align in a second direction that is at least generally perpendicular to the first direction of the polymers of the first polarizing layer. The alignment of the polymers of the second polarizing layer with the polymers of first polarizing layer can accordingly enable a user to see a change in color or other visual characteristics of the tape at the end portion. For example, the alignment of the polymers of the second polarizing layer with the polymers of the first polarizing layer can enable a user to see the colored substrate through the aligned first and second polarizing layers. In other embodiments, however, the colored substrate may be visible through the initially aligned first and second polarizing layers, with tape 100 in an unstretched condition. For example, the polymers of the second polarizing layer can be generally aligned with the polymers of the first polarizing layer before the tape is stretched to separate a desired length from the roll. Stretching tape 100 can accordingly reorient the polymers of the second polarizing layer with reference to the polymers of the first polarizing layer to block the view of the colored substrate through the two (now non-aligned) polarizing layers.

In yet further exemplary embodiments, tape 100 can include one or more dichroic filters or dichroic filter layers to provide the visual indication of end portion 102 of tape 100. Dichroic filters, or interference filters, selectively pass light having bandwidths for specific ranges of color, while blocking or reflecting light having bandwidths corresponding to other ranges of color. For example, backing material 104 can include a dichroic filter layer disposed over a colored substrate. The dichroic filter can allow light of a specific wavelength to pass through to the substrate. When tape 100 is stretched or otherwise in tension, the dichroic filter layer accordingly becomes thinner, thereby changing the wavelength of the light that passes through to the substrate. In this manner, stretching the tape 100 can change the color of the light that passes through the dichroic filter layer to change the wavelength or color of edge 108 at end portion 102 on tape 100.

In other exemplary embodiments, backing material 104 can include a plurality of dichroic filter layers. Each dichroic filter layer of the plurality of dichroic filter layers can allow light of a specific different waveband or wavelength (e.g., light in the red spectrum, blue spectrum, green spectrum, etc.) to pass, while blocking light of other wavebands or wavelengths. When tape 100 is stretched, the plurality of dichroic filters become thinner, which changes the visual characteristics of the tape 100 by altering the pass waveband or wavelength of the plurality dichroic filters.

Figure 2A:
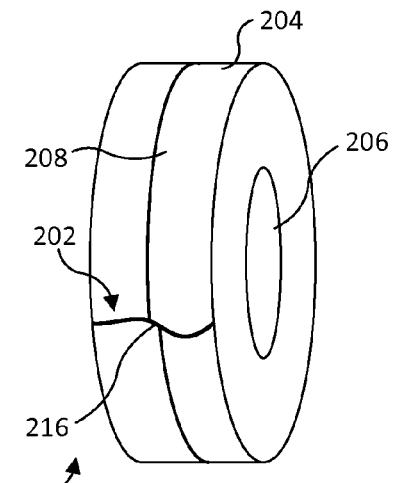
FIG. 2A is an isometric view of a roll of tape configured in accordance with another embodiment of the disclosure.

FIG. 2A is an isometric view of a tape 200 that is rolled and configured in accordance with another embodiment of the disclosure. Tape 200 includes several features that are generally similar in structure and function to corresponding features of tape 100, as described above with reference to FIGS. 1A and 1B. For example, tape 200 includes a backing material 204 with a corresponding adhesive and is wound around a core 206. Tape 200 can optionally also include an end portion 202 that exhibits a change in color or change in other visual characteristic(s), to enable a user to easily find and remove end portion 202 from where it is adhered to the roll of tape 200. In the illustrated exemplary embodiment, however, the tape 200 also includes a different visual indicator 208 configured to enable a user to both identify the cut or torn end portion of tape 200, as well as to easily determine how much of tape 200 remains on core 206.

More specifically, visual indicator 208 can be a visible line of a contrasting color to the color of tape 200 (embedded in, dyed, or printed on tape 200) extending diagonally along backing material 204 between opposite corners of the tape 200. Alternatively, it is also contemplated that successive sections of tape 200 can be provided with the diagonally extending line and can be distinguished by the use of different contrasting colors (relative to the color of tape 200), where each color for the line corresponds to a different portion of the total length of the tape on the roll. For example, if five different successive equal length sections of tape 200 are each provided with a different one of five differently colored lines, e.g., red, blue, black, yellow, and purple, the color of the line currently visible on the outer surface of the roll of tape 200 can indicate in which section the end portion is. It should be noted that more or less than five differently colored visual indicators 208 can be used, depending upon the number of sections to be thus identified. Accordingly, if five differently colored lines are used as provided in the above-noted example, and if the blue line is visible, the user would know that the amount of tape remaining on the roll was between 60% and 80%, while if the purple colored line is currently visible, the user would know that the amount of tape remaining is between 0% and 20%.

Figure 2B:
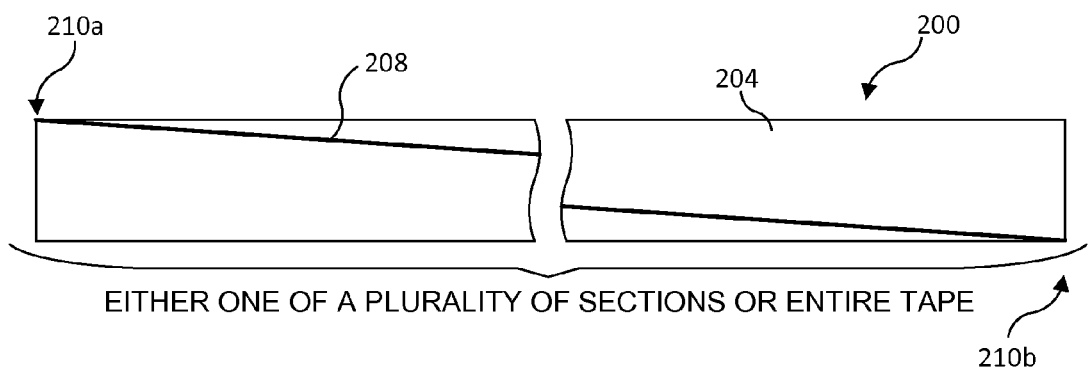
FIG. 2B is a top view of the tape of FIG. 2A illustrating the tape unwound from the roll shown in FIG. 2A.

However, the amount of tape remaining can be determined with even more precision—even if only a single colored visual indicator 208 is used that extends diagonally along the entire length of the tape on the roll. FIG. 2B illustrates a top view of the tape 200 of FIG. 2A, illustrating the tape 200 in a flat or unwound configuration for a specific color of visual indicator 208. As shown in FIG. 2B, the visual indicator 208 extends along the backing material 204 from a first corner 210a at the beginning of the tape 200, to a second corner 210b opposite the first corner 210a at the end of the tape 200, or, if a plurality of sections are marked with visual indicators of different colors, then visual indicator 208 of a given color extends from one corner at the beginning of that section, to a diagonally opposite corner at the end of the section. In certain embodiments, the visual indicator 208 can be a line printed, embedded, embossed, dyed, or otherwise applied to the backing material 204. In other embodiments, however, and as explained in detail below, the visual indicator 208 can have other configurations other than a continuous line.

Figure 2C:
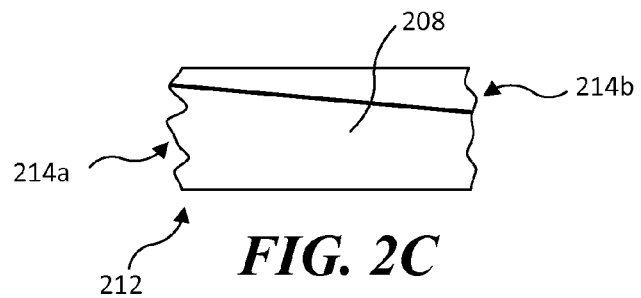
FIG. 2C is an enlarged top view of a portion of the tape of FIG. 2B.

As explained above, the visual indicator is configured to enable a user to easily determine what percentage of tape 200 has been used or remains when the user views a piece of tape 200 that has been torn, cut, or otherwise removed from the roll of tape 200. FIG. 2C, for example, is an enlarged top view of a segment 212 of tape 200 of FIG. 2B that a user has removed (torn, cut, etc.) from the roll of tape 200. As shown in FIG. 2C, tape segment 212 includes visual indicator 208 extending diagonally between a first end portion 214a and a second end portion 214b opposite first end portion 214a. In certain embodiments, first and second end portions 214 can be tear or cut lines where the user has removed the portion of tape 200 from the roll. The position of visual indicator 208 with reference to first end portion 214a and/or second end portion 214b can be used to determine what percentage of tape 200 (FIG. 2B) has been used or is available. More specifically, the location of visual indicator 208 relative to the corresponding corner of either first end portion 214a or second end portion 214b enables a user to quickly and easily determine how much, i.e., the relative percentage, of tape 200 is left on the roll.

In FIG. 2C, for example, the end of the visual indicator is relatively closer to the upper left corner of first end portion 214a, where that upper left corner would be at the beginning of the tape (or section) and closer to the core. Therefore, on a roll of tape for which only a single color of visual indicator 208 is used, a user can easily determine that tape segment 212 was removed from a roll of tape 200 that is close to running out. Or, if a plurality of different colored visual indicators 208 are being used for a corresponding number of sections of tape, a user can tell that tape segment 212 was removed from the roll close to the beginning (i.e., nearer the core) of the section.

Although the visual indicator 208 illustrated in FIGS. 2A-2C includes a continuous and generally straight diagonal line, in other embodiments, however, the visual indicator 208 can have other features. For example, the visual indicator can be a segmented, dashed, or other type of discontinuous line, and/or include curved portions. Moreover, the visual indicator 204 can include a series of symbols or other marks extending along the backing material 208 to enable a user to easily ascertain how much of the tape 200 is left. In still further embodiments, the visual indicator 208 can be a dividing line between two different colors, shades, or tones of backing material 204. For example, the tape 200 can have a two-tone backing material 204 with the visual indicator 208 extending between the different tones or colors of the backing material 204.

It should also be noted that visual indicator 208 can also indicate the end portion of tape 200, as shown in FIG. 2A. Since the visual indicator is a diagonal line, the position of the diagonal line between opposite edges at the end portion of the tape will be slightly different than the position of the diagonal line between the edges of tape 200 on the underlying portion of the tape on the roll immediately under the place where the end portion is adhered to the roll. A discontinuity 216 between the positions of the visual indicator across the width of the tape at the end portion and at the position underlying the end portion will thus be visually apparent as shown in FIG. 2A. Clearly, by using a plurality of visually different visual indicator lines, each for a corresponding different segment of the tape, it will be easier to discern discontinuity 216, since the slope of the diagonally extending line comprising the visible indicator will be greater for each segment than using only a single visible indicator 208 that extends the entire length of tape 200, and thus, the discontinuity between the visual indicator on the end of tape 200 that was cut or torn and the point on the remaining tape immediately under that end will be greater, compared to the embodiment in which a single visual indicator extends the entire length of the tape.

Although the concepts disclosed herein have been described in connection with the preferred form of practicing them and modifications thereto, those of ordinary skill in the art will understand that many other modifications can be made thereto within the scope of the claims that follow. Accordingly, it is not intended that the scope of these concepts in any way be limited by the above description, but instead be determined entirely by reference to the claims that follow.

The invention in which an exclusive right is claimed is defined by the following:

1. A tape provided with a visual indication of an end of the tape, comprising:
   (a) a backing material provided with an adhesive that enables the tape to adhere to a surface on which the tape is applied; and
   (b) a visual indicator having a physical configuration that changes as a desired length of the tape is cut or torn from a remainder of the tape, so that a change in the physical configuration of the visual indicator enables a user to visually determine a disposition of the end of the tape adhered to the remainder of the tape, wherein the change in the physical configuration of the visual indicator caused by stretching the tape where it is cut or torn away from the remainder of the tape causes the visual indicator to change at least one physical characteristic selected from the group of physical characteristics consisting of:
  (i) in a color visually apparent at the end of the tape;
  (ii) an opacity visually apparent at the end of the tape; and
  (iii) a reflectance visually apparent at the end of the tape.

2. The tape of claim 1, further comprising a central core on which the tape is rolled.

3. A tape provided with a visual indication of an end of the tape, comprising:
  (a) a backing material provided with an adhesive that enables the tape to adhere to a surface on which the tape is applied; and
  (b) a visual indicator having a physical configuration that changes as a desired length of the tape is cut or torn from a remainder of the tape, so that a change in the physical configuration of the visual indicator enables a user to visually determine a disposition of the end of the tape adhered to the remainder of the tape, wherein the visual indicator comprises at least one layer of elongate polymer elements that visually change where the tape is stretched while cutting or tearing the desired length from the remainder of the tape.

4. The tape of claim 3, wherein the elongate polymer elements are either initially randomly oriented before the tape is stretched, or after the tape is stretched while cutting or tearing the desired length from the remainder of the tape, wherein a random orientation of the elongate polymer elements produces a different visually perceptible physical characteristic than an aligned orientation of the elongate polymer elements.

5. The tape of claim 3, wherein the elongate polymer elements experience a change in cross-sectional size as the tape is stretched while cutting or tearing the desired length from the remainder of the tape, so that a change in the cross-sectional size of the elongate polymer elements causes a perceptible change in a visual characteristic of the elongate polymer elements, causing the end of the tape to be visually evident.

6. A tape provided with a visual indication of an end of the tape, comprising:
  (a) a backing material provided with an adhesive that enables the tape to adhere to a surface on which the tape is applied; and
  (b) a visual indicator having a physical configuration that changes as a desired length of the tape is cut or torn from a remainder of the tape, so that a change in the physical configuration of the visual indicator enables a user to visually determine a disposition of the end of the tape adhered to the remainder of the tape, wherein the visual indicator comprises a polarizing layer of polymers that visibly changes where the tape is stretched when cutting or tearing the desired length from the remainder of the tape.

7. The tape of claim 6, wherein the visual indicator comprises a second polarizing layer of polymers wherein the polarizing layer and the second polarizing layer overlie a colored layer, and wherein an alignment between the two polarizing layers changes as the tape is stretched when cutting or tearing the desired length from the remainder of the tape, so that a visibility of the colored layer through the two polarizing layers changes, enabling the end of the tape to be visually perceptible.

8. The tape of claim 6, wherein the polarizing layer comprises amorphous or randomly oriented polymers, overlying a colored layer, and wherein the colored layer becomes visible through the polarizing layer due to the polymers becoming aligned as the tape is stretched when cutting or tearing the desired length from the remainder of the tape, so that the visibility of the colored layer at the end of the tape is readily perceptible through aligned polymers in the polarizing layer.

9. A tape provided with a visual indication of an end of the tape, comprising:
  (a) a backing material provided with an adhesive that enables the tape to adhere to a surface on which the tape is applied; and
  (b) a visual indicator having a physical configuration that changes as a desired length of the tape is cut or torn from a remainder of the tape, so that a change in the physical configuration of the visual indicator enables a user to visually determine a disposition of the end of the tape adhered to the remainder of the tape, wherein the visual indicator comprises one or more dichroic filter layers that each selectively pass light of a different waveband or wavelength corresponding to a specific range of colors, the one or more dichroic filter layers overlying a colored layer, so that as the tape is stretched when cutting or tearing the desired length from the remainder of the tape, the one or more dichroic layers become thinner, changing the waveband or the wavelength of light passed through the one or more dichroic filter layers, and thus, changing a color of the light passed through each dichroic filter, thereby changing a visual characteristic of the colored layer visible through the one or more dichroic filters at the end of the tape.

10. A method for enabling a user to more readily visually determine where an end of a tape is disposed, when an adhesive on the tape adheres the end to a remainder of the tape, comprising:
  (a) providing a visual indicator with the tape that can be used to provide a visual indication of where the end of the tape is located on the remainder of the tape; and
  (b) changing a physical configuration of the visual indicator when a desired length of the tape is cut or torn from the remainder of the tape, the change in the physical configuration of the visual indicator making evident a location of the end of the tape on the remainder of the tape, wherein changing the physical configuration of the visual indicator comprises at least one action selected from the group of actions consisting of:
    (i) in producing a visible color at the end of the tape that contrasts with a color of the remainder of the tape as the tape is stretched when cut or torn;
    (ii) producing an opacity at the end of the tape that is different than that of the remainder of the tape as the tape is stretched when cut or torn; and
    (iii) producing a reflectance at the end of the tape that is different than that of the remainder of the tape.

11. A method for enabling a user to more readily visually determine where an end of a tape is disposed, when an adhesive on the tape adheres the end to a remainder of the tape, comprising:
  (a) providing a visual indicator over a backing material of the tape that can be used to provide a visual indication of where the end of the tape is located on the remainder of the tape; and (b) changing a physical configuration of the visual indicator when a desired length of the tape is cut or torn from the remainder of the tape, the change in the physical configuration of the visual indicator making evident the location of the end of the tape on the remainder of the tape, wherein changing the physical configuration of the visual indicator comprises changing a characteristic of elongate polymer elements included in at least one layer of the tape, while cutting or tearing the desired length from the remainder of the tape, and wherein changing the characteristic of the elongate polymer elements produces a different visually perceptible appearance of the tape, so that the end of the tape is visibly evident.

12. The method of claim 11, wherein changing the characteristic of the elongate polymer elements comprises changing a cross-sectional size of the elongate polymer elements included in at least one layer of the tape as the tape is stretched when cutting or tearing the desired length from the remainder of the tape, so that a change in the cross-sectional size of the elongated polymer elements causes a perceptible change in a visual characteristic of the elongate polymer elements, enabling the end of the tape to be visually evident.

13. The method of claim 11, wherein the elongate polymer elements are either initially randomly oriented before the tape is stretched, or after the tape is stretched, while cutting or tearing the desired length from the remainder of the tape, and wherein a random orientation of the elongate polymer elements produces a different visually perceptible characteristic than an aligned orientation of the elongate polymer elements, so that the end of the tape is visibly evident.

14. A method for enabling a user to more readily visually determine where an end of a tape is disposed, when an adhesive on the tape adheres the end to a remainder of the tape, comprising:

(a) providing a visual indicator with the tape that can be used to provide a visual indication of where the end of the tape is located on the remainder of the tape; and (b) changing a physical configuration of the visual indicator when a desired length of the tape is cut or torn from the remainder of the tape, the change in the physical configuration of the visual indicator making evident the location of the end of the tape on the remainder of the tape, wherein the visual indicator comprises a polarizing layer of polymers, and wherein changing the physical configuration of the visual indicator comprises modifying a condition of the polymers as the tape is stretched when cutting or tearing the desired length from the remainder of the tape, modification of the condition of the polymers being visually perceptible, so that the end of the tape is readily visually perceptible, enabling the end of the tape to be visibly evident.

15. The method of claim 14, wherein the visual indicator comprises a second polarizing layer of polymers wherein the polarizing layer and the second polarizing layer overlie a colored layer, and wherein changing the physical configuration of the visual indicator by modifying the condition of the polymers comprises changing an alignment between the two polarizing layers as the tape is stretched when cutting or tearing the desired length from the remainder of the tape, so that a visibility of the colored layer through the two polarizing layers changes, enabling the end of the tape to be visually perceptible.

16. The method of claim 14, wherein the polarizing layer comprises amorphous or randomly oriented polymers, overlying a colored layer on the tape, and wherein changing the physical configuration of the visual indicator comprises aligning the amorphous or randomly oriented polymers as the tape is stretched when cutting or tearing the desired length from the remainder of the tape, so that the visibility of the colored layer at the end of the tape is readily perceptible through aligned polymers in the polarizing layer, enabling the end of the tape to be visibly evident.

17. A method for enabling a user to more readily visually determine where an end of a tape is disposed, when an adhesive on the tape adheres the end to a remainder of the tape, comprising:

(a) providing a visual indicator with the tape that can be used to provide a visual indication of where the end of the tape is located on the remainder of the tape; and (b) changing a physical configuration of the visual indicator when a desired length of the tape is cut or torn from the remainder of the tape, the change in the physical configuration of the visual indicator making evident the location of the end of the tape on the remainder of the tape, wherein the visual indicator comprises one or more dichroic filter layers that each selectively pass light of a different waveband or wavelength corresponding to a specific range of colors, the one or more dichroic filter layers overlying a colored layer, and wherein changing the physical configuration of the visual indicator comprises causing the one or more dichroic filter layers to become thinner at the end of the tape as the tape is stretched when cutting or tearing the desired length from the remainder of the tape, changing a waveband or a wavelength of light passed through the one or more dichroic filter layers, and thus, changing a color of the light passed through each dichroic filter, thereby changing a visual appearance of the colored layer visible through the one or more dichroic filters at the end of the tape.

* * * * *